Patented Mar. 18, 1952

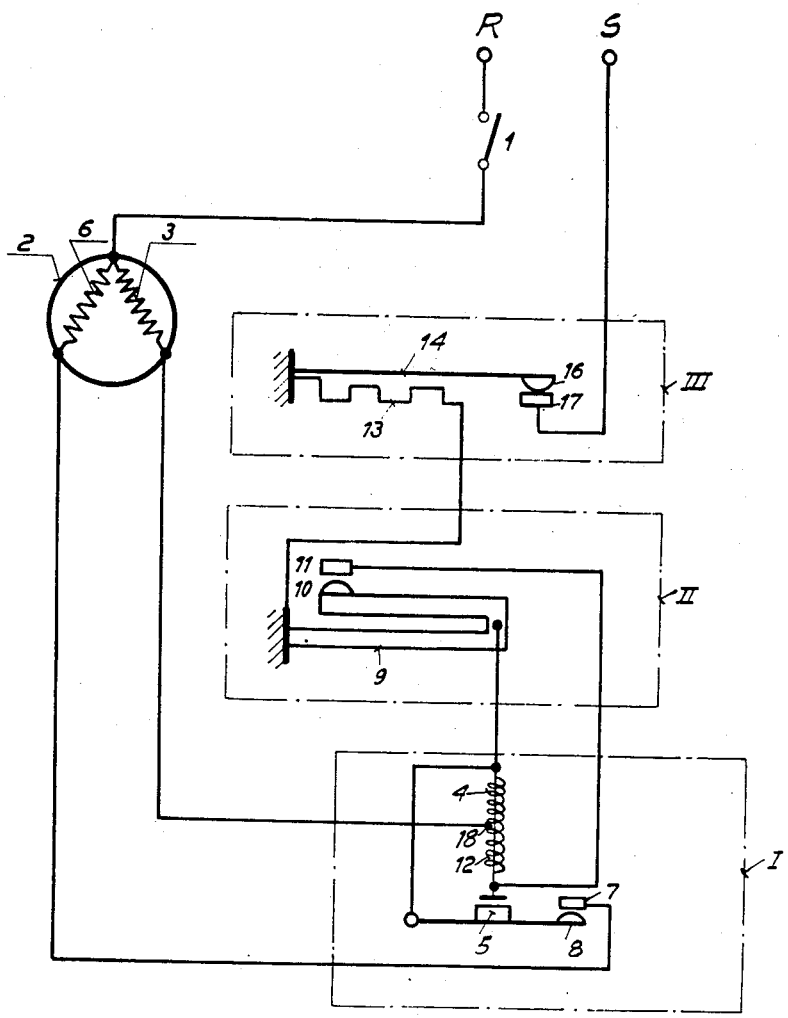

2,589,893

UNITED STATES PATENT OFFICE 2,589,893

RELAY DEVICE FOR STARTING AND PROTECTING SINGLE-PHASE INDUCTION MOTORS, PARTICULARLY FOR COMPRESSION REFRIGERATOR MOTORS

Stefan Szaniszlo, Caronno Pertusella, Italy, assignor to Siemens Società Per Azioni, Milano, Italy, a corporation of Italy Application March 25, 1950, Serial No. 151,864
In Italy April 2, 1949

7 Claims. (Cl. 318—221)

The invention relates to a relay device for the starting and overload protection of single-phase induction motors. The device is particularly suitable for starting and protecting the drive motors of refrigerator compressors.

Such motors, as a rule, are provided with an auxiliary-phase starting winding, and the purpose of the device according to the invention is:

(a) To cause the auxiliary winding to be energized at each starting of the motor;

(b) To prevent current from flowing through the auxiliary winding appreciably longer than necessary for starting the motor under normal conditions;

(c) To cause the motor to be disconnected should it for any reason draw a current higher than the running rate current.

In a known device of this kind the three above mentioned operations are performed by three relays, two of which are generally of the thermal time-lag type and one of the electromagnetic type. More particularly, the latter relay is provided for the starting proper, while one of the two thermal relays serves for controlling the starting operation and the other as a motor protective relay.

The device according to this invention also comprises generally three relays. According to the invention the electromagnetic starting relay has its exciting winding divided into two partial windings, which are arranged and connected in such a manner that, when a current is flowing through both windings, the magnetic fluxes produced by them neutralize each other thus causing the relay to be deenergized.

One of the two partial windings is connected in series with the main winding of the motor and a current is steadily flowing through it during the operation of the motor. The number of turns of this partial winding is such that the armature of the relay is attracted only when the current flowing through this partial winding is the starting current but is not attracted when the current is the normal running current of the motor.

The other partial winding of the electromagnetic relay is connected across the first mentioned partial winding in a branch circuit which is normally open and controlled by a time relay which is only activated under abnormal starting conditions.

These and other features of the device according to the invention are pointed out in the following description of the embodiment diagrammatically illustrated by way of example in the accompanying drawing.

In the drawing, R and S are two terminals for connection to the supply line; I is a main switch which in the case of a refrigerator may also consist in a thermostat. The single-phase induction motor 2 to be controlled has a main winding 3 and an auxiliary-phase starting winding 6. Denoted by I, II, III are the three relays constituting the starting and protecting device for the motor 2.

The relay I is of the electromagnetic type and comprises an electromagnet whose exciting winding is divided into two partial windings 4, 12 and supplied with current through a tap 18, an armature 5, and a pair of contacts 7, 8 controlled by the armature.

The relay II is of the thermal type and comprises a bimetal strip 9 controlling a pair of contacts 10, 11.

The relay III is also of the thermal type and comprises a bimetal strip 14 heated by a resistance 13 and controlling a pair of contacts 16, 17.

The operation of the system so far described is as follows: Switch I when closed completes an electric circuit which may be traced from the terminal R through the main winding 3 of the motor 2, winding 4 of relay I, bimetal strip 9 of relay II, resistance 13 and bimetal strip 14 of relay III, and closed contacts 16, 17 to terminal S. The strong starting current flowing through this circuit and hence also through the winding 4 causes attraction of the armature 5 which closes the contacts 7, 8 and thus connects the starting winding 6 of the motor into the energizing circuit. At this moment no current is flowing through the partial winding 12 as the circuit thereof is open at the contacts 10, 11.

The motor starts and as its number of revolutions approaches the synchronous speed, the starting current decreases to the normal running value. As mentioned, this current is no longer sufficient to hold the armature 5 in attracted position so that the armature drops, disconnecting the auxiliary phase 6 which is now unnecessary.

Should for any reason (cold oil, low voltage) the motor fail to start, then the short circuit current flowing through the above-mentioned circuit causes, after a short time interval, a heating of the bimetal strip 9 sufficient to effect closing of the contacts 10, 11 thus connecting the partial winding 12 parallel to winding 4. Since the ampere turns of the two partial windings 4 and 12 are equal, the fluxes generated by these windings, being equal and opposite, neutralize each other and the armature 5 drops, disconnecting the starting winding 6 of the motor 2.

Simultaneously or shortly thereafter, the bimetal strip 14, being heated by the short circuit current flowing through the resistance 13, also bends and opens the motor circuit at the contacts 16, 17. The cycle is repeated as soon as the bimetal strip 14 has become sufficiently cold to reclose its contacts 16, 17 and after the bimetal strip 9 cools sufficiently to re-open its contacts 10, 11.

Of course, relay III functions also to interrupt the circuit of the motor during its operation every time the current exceeds its normal value. The higher the overcurrent, the shorter is the time interval within which the interruption occurs.

Devices according to the invention afford considerable improvements as regards simplicity, sensitivity and safety of operation as well as a long useful life of the control contacts. These advantages will be realized from the following. The directly heated bimetal strip 9 must respond within an interval of time as short as possible, usually within a small fraction of one second. Hence, the mass of this bimetal is small and the mechanical closing force for contacts 10, 11, in consequence, is also small. It is apparent, therefore, that for securing a safe and lastingly-good contact engagement at these contacts, as little duty as possible should be imposed on them and a sufficiently high voltage difference between these contacts should be provided. Both conditions are satisfied by the above-described subdivision of the relay winding into partial windings 4, 12 according to the invention. The current-carrying duty imposed upon the contacts is greatly reduced by the fact that the current traversing these contacts at the closing moment is not the entire short circuit current by only a fraction thereof. On the other hand, a sufficiently high voltage difference between contacts 10 and 11 is also achieved because this voltage is the geometric sum of the voltage obtaining across the partial winding 4 and the voltage induced by transformer action in the partial winding 12.

It will be noted that the relay III may be omitted if a protection against overload is not needed or obtained in a different manner.

I claim:

1. In combination, a single-phase induction motor having a main winding and a starting winding, an energizing circuit having two leads of which one is connected to said two windings, a timing relay having normally open first contact means and having a contact control member responsive to motor starting current, an electromagnetic relay having normally open second contact means and having two partial coils for controlling said second contact means, said two coils having a common circuit point and two respective end points, said two end points being connected across said first contact means, one of said partial coils being connected in series with said control member and in series with said main winding between said two leads through said common circuit point, said starting winding being connected through said second contact means with said other lead, and said two coils having mutually substantially neutralized fluxes when both energized to then cause opening of said second contact means.

2. In combination, a single-phase induction motor having a main winding and a starting winding, an energizing circuit having two leads of which one is connected to said two windings, a timing relay having normally open first contact means and having a contact control member responsive to motor starting current, an electromagnetic relay having normally open second contact means and having two partial coils for controlling said second contact means, said two coils having a common circuit point and two respective end points, said circuit point being connected with said main winding, one of said end points being connected through said first contact means with said other lead, said other end point being connected through said second contact means with said starting winding and being connected in series with said control member to said other lead, said two coils having mutually substantially neutralized fluxes when both energized to then cause opening of said second contact means.

3. In combination, a single-phase induction motor having a main winding and a starting winding, an energizing circuit having two leads of which one is connected to said two windings, a timing relay having normally open first contact means and having a contact control member responsive to motor starting current, an electromagnetic relay having normally open second contact means and having two partial coils for controlling said second contact means, said two coils having a common circuit point and two respective end points, said two end points being connected across said first contact means, one of said coils being connected in series with said control member and in series with said main winding between said two leads through said common circuit point, said starting winding being connected through said second contact means with said other lead, said two coils having a common core and forming together a transformer so that a current flowing in one of said coils induces electromotive force in the other coil, and said two coils having mutually substantially balanced fluxes when both traversed by current to then cause opening of said second contact means.

4. For use with a single-phase induction motor having a main winding and a starting winding, a relay device comprising a line terminal and two leads for connection to the respective windings of a motor to be controlled, a timing relay having normally open first contact means and having contact control means responsive to motor starting current, an electromagnetic relay having normally open second contact means and having two partial coils for controlling said second contact means, said two coils having a common circuit point and two respective end points, said two end points being connected across said first contact means, one of said partial coils being connected in series with said control member and through said terminal and one of said leads, said terminal being connected through said second contact means with said other lead, and said two coils having mutually substantially neutralized fluxes when both energized to then cause opening of said second contact means.

5. For use with a single-phase induction motor having a main winding and a starting winding, a relay device comprising a line terminal and two leads for connection to respective windings of a motor to be controlled, a timing relay having normally open first contact means and having contact control means responsive to motor starting current, an electromagnetic relay having normally open second contact means and having two partial coils for controlling said second contact means, said two coils having a common circuit point and two respective end points, one of said leads being connected with said two partial coils at said circuit point, one of said end points being connected through said first contact means with said terminal, said other end point being connected through said second contact means with said other lead and being connected in series with said control member to said terminal, said two coils having mutually substantially neutralized fluxes when both energized to then cause opening of said second contact means.

6. For use with a single-phase induction motor having a main winding and a starting winding, a relay device comprising a line terminal and two leads for connection to the respective windings of a motor to be controlled, a timing relay having normally open first contact means and having a thermostatic member responsive to motor starting current for controlling said first contact means, an electromagnetic relay having normally open second contact means and having two partial coils for controlling said second contact means, said two coils having a common circuit point and two respective end points, said two end points being connected across said first contact means, said thermostatic member being connected in series with one of said partial coils and through said common circuit point between said terminal and one of said leads, said terminal being connected through said second contact means with said other lead said two coils having a common magnetic circuit so that a current flowing in one of said coils induces electromotive force in the other coil, and said two coils having mutually substantially balanced fluxes when both traversed by current to then cause opening of said second contact means.

7. In a relay device according to claim 4, said two coils having a common magnet core and forming together a transformer so that the coil first energized induces an electromotive force in the other coil, and said other coil having a rated current of only a fraction of that of said first energized coil.

STEFAN SZANISZLO.

No references cited.